Jan. 20, 1970    R. E. GOTTSCHALK ET AL    3,490,833
COUNTERBALANCING SPACER FOR FILM MAGAZINE AND
HAND HELD MOTION PICTURE CAMERA
Filed April 17, 1967    3 Sheets-Sheet 1
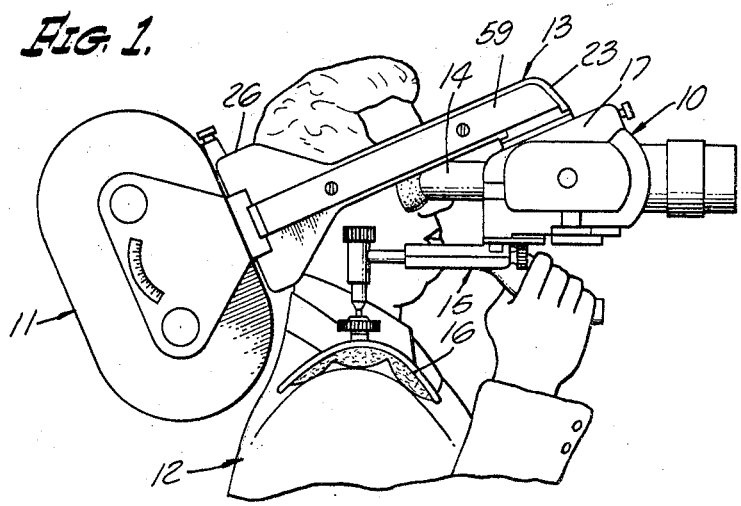
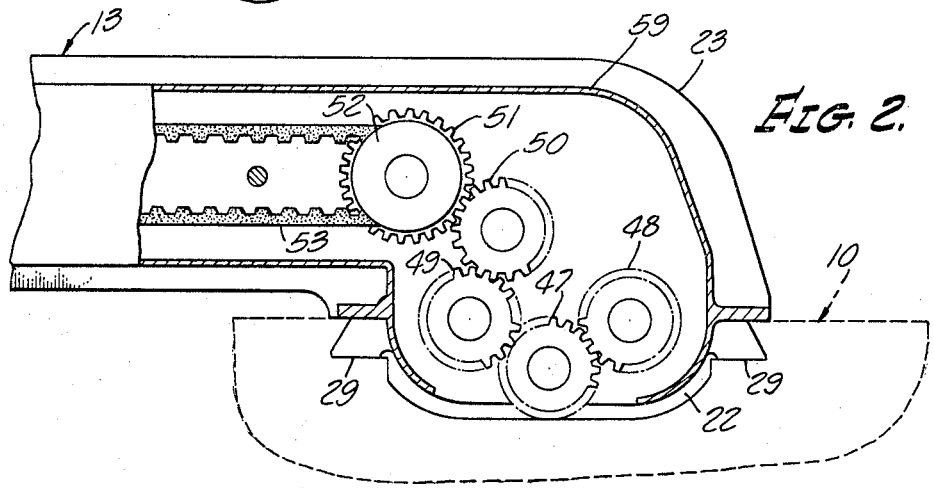
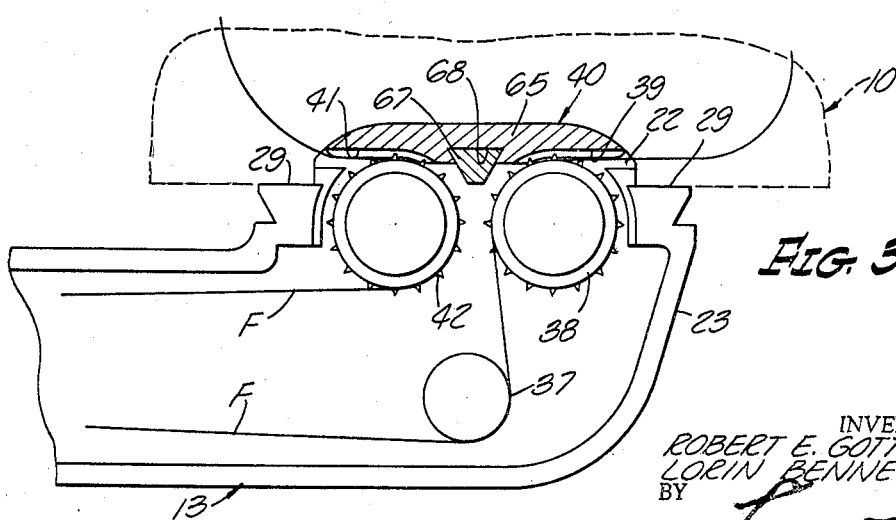
INVENTORS.
ROBERT E. GOTTSCHALK
LORIN BENNETT
BY
Lyon Lyon
ATTORNEYS

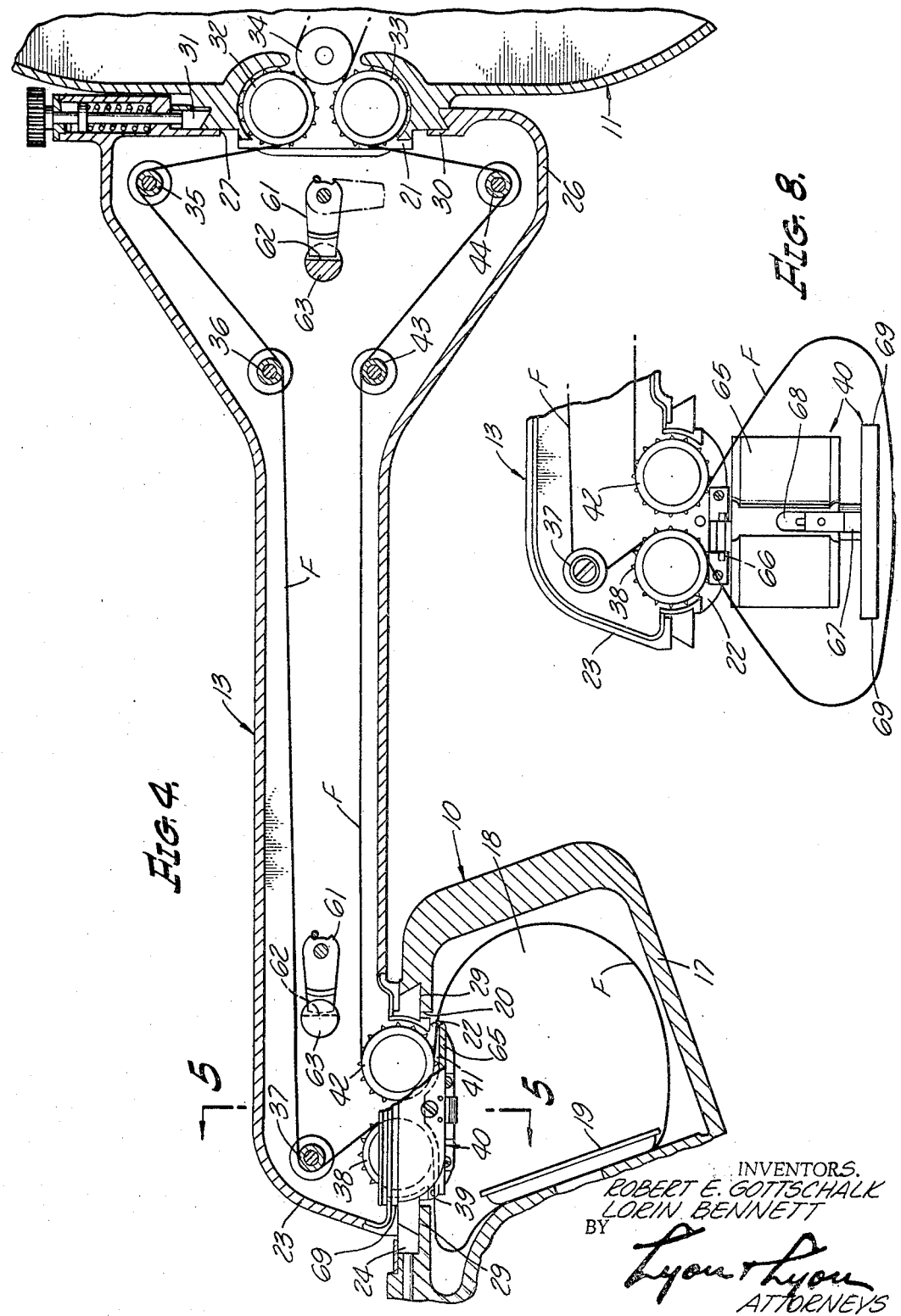

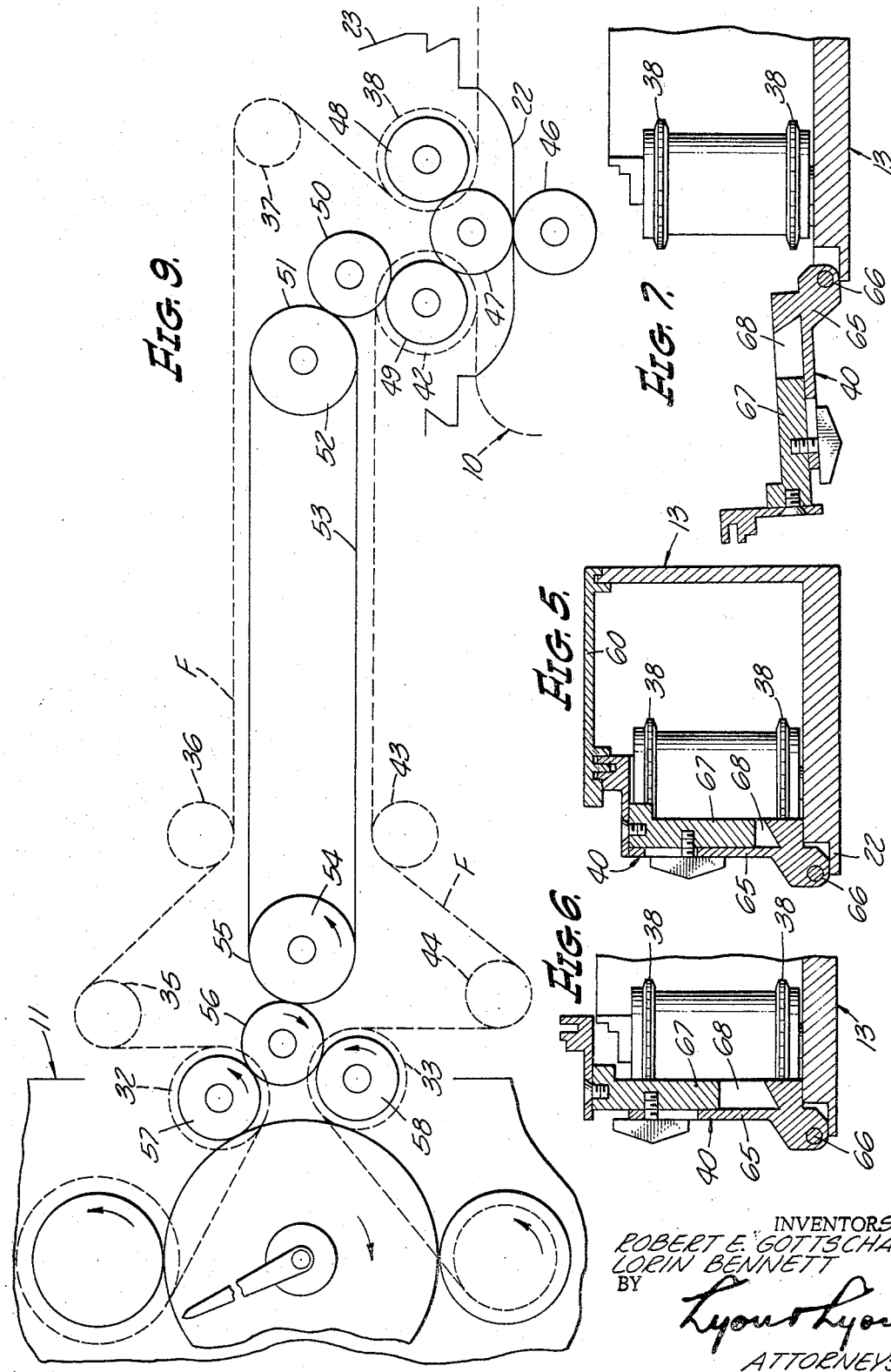

United States Patent Office 3,490,833
Patented Jan. 20, 1970

3,490,833
COUNTERBALANCING SPACER FOR FILM MAGAZINE AND HAND HELD MOTION PICTURE CAMERA
Robert E. Gottschalk, Los Angeles, and Lorin Bennett, Gardena, Calif., assignors to Panavision, Incorporated, Los Angeles, Calif., a corporation of California
Filed Apr. 17, 1967, Ser. No. 631,526
Int. Cl. G03b 23/02, 17/00
U.S. Cl. 352—72         17 Claims

ABSTRACT OF THE DISCLOSURE

A spacer for counterbalancing a hand held motion picture camera has a projection at one end for detachable reception within an opening in the camera housing. At the opposite end the spacer has an opening for detachably receiving a projection on a film magazine. The spacer contains film driving elements such that an element of the camera may drive an element of the film magazine for advancing film from the magazine through the spacer to the camera and back to the magazine.

BACKGROUND OF THE INVENTION

This invention relates to motion picture cameras which are carried by the photographer and held manually, and more particularly relates to a film transporting spacer interposed between the camera and the film magazine. A device of this type may be classified as motion picture film magazine apparatus.

Hand held cameras play an important role in commercial motion picture production because they permit greater freedom of movement of the camera than when it is mounted on a tripod or dolly. Hand held cameras are used in places of restricted dimensions or difficult access and are often used in present day techniques in a mobile manner to depict the scene which a moving actor sees. It is of course essential in the production of moving picture sequences of acceptable commercial quality that the camera be held steady. This may require considerable manual strength on the part of the cameraman who supports the weight of the camera and film magazine in his hands. The present invention overcomes this difficulty by interposing a film transporting spacer element between the hand held camera and the film magazine, so that the weight of the film magazine counterbalances the weight of the hand held camera on a shoulder-contacting support attached to the camera. The cameraman need not support the weight of the camera in is hands because of this counterbalancing effect and hence is able to hold the camera steady without fatigue. Moreover, the film transporting spacer passes over his shoulder in the position so that it may be contacted by the side of his head, thereby further steadying the camera. The spacer member may be used with a conventional camera and a conventional film magazine and contains power transmitting mechanism for driving the moving parts of the film magazine from the camera.

SUMMARY

Briefly stated, this invention relates to a film transporting spacer interposed between a hand held motion picture camera and a power driven film magazine without requiring any alteration of a conventional camera or a conventional film magazine. The weight of the film magazine counterbalances the weight of the camera on a shoulder-contacting support. The loop of film which extends out of the film magazine is drawn through the interior of the spacer member and by moving a door the loop of film is passed out of the end of the spacer and into the interior of the camera for passage through the conventional gate and camera movement. When closed, the door prevents any light leak between the spacer member and the camera housing.

BRIEF DESCRIPTION OF THE DRAWINGS

FIGURE 1 is a side elevation showing a preferred embodiment of this invention and illustrating a conventional hand held camera and a conventional film magazine connected by a spacer member, the weight of the parts being counter-balanced over a shoulder-contacting support.

FIGURE 2 is a side elevation partly broken away showing a portion of the apparatus on an enlarged scale.

FIGURE 3 is a view similar to FIGURE 2 partly in section showing the reverse side of the apparatus shown in FIGURE 2.

FIGURE 4 is a side elevation of a portion of the apparatus shown in FIGURE 1, with the cover removed, and the motion picture camera and film magazine therefor both partly broken away.

FIGURE 5 is a sectional elevation taken substantially on the lines 5—5 as shown in FIGURE 4.

FIGURE 6 is a view similar to FIGURE 5 showing the first stage of opening of the door member.

FIGURE 7 is a view similar to FIGURE 6 showing the door in fully opened position.

FIGURE 8 is a view showing a portion of FIGURE 4 and showing the door in fully opened position as in FIGURE 7.

FIGURE 9 is a schematic layout showing the film path and showing the drive train, all from a side of the mechanism as shown in FIGURES 1 and 2.

DESCRIPTION OF THE PREFERRED EMBODIMENT

The motion picture camera generally designated 10 may be of any suitable or desirable construction. While we have shown in the drawings a 35 mm. Arriflex Camera distributed by Arriflex Corporation of America, New York City, this is by way of illustration only. Also shown by way of illustration is an Arriflex 35 mm. Film Magazine of 400 ft. capacity. In conventional practice, the film magazine 11 is mounted directly on the motion picture camera 10, but in this conventional construction the weight of the film magazine and the weight of the motion picture camera must all be supported in front of the cameraman or photographer 12. In accordance with this invention, a spacer member generally designated 13 is operatively interposed between the motion picture camera 10 and the film magazine 11. The length of the spacer member 13 is such that with the motion picture camera 10 placed in front of the photographer 12 for viewing through the eye piece 14, the location of the film magazine 11 is behind the photographer. An adjustable support mechanism 15 is attached to the camera 10 and includes a shoulder-contacting element 16. The proportions of the parts are such that the weight of the camera 10 and the weight of the magazine 11 are counterbalanced and are supported on the shoulder of the photographer. One side of the spacer member 13 may contact the head of the photographer for further steadying action. The motion picture camera 10 includes a housing 17 having a central cavity 18 which contains the film gate 19. The housing 17 has an opening 20 which in conventional operation receives a projection 21 provided on the film magazine 11. In accordance with our invention, however, a projecting part 22 on the forward end 23 of the spacer 13 projects into this opening 20. Tapered parts are used for a dovetail connection 29 and a movable wedge 24 secures the camera housing 17 to the forward end 23 of the spacer member 13.

The other end 26 of the spacer member 13 is provided with an opening 27 into which the projection 21 extends. This projection 21 is a part of the film magazine 11. Dovetail parts and a movable wedge 31 serve to hold the parts in position against separation. It will be noted that as shown in FIGURE 4, the opening 20 for the projection 22 lies substantially in a horizontal plane, while the opening 27 for the projection 21 lies substantially in a vertical plane. Accordingly, the connection between the spacer member 13 and the camera 10 is substantially at right angles to the connection between the spacer member 13 and the film magazine 11.

The conventional film magazine 11 contains power driven sprockets 32 and 33 and an idler roller 34. Motion picture film F extends from a supply within the magazine 11 over the roller 34, under the power driven sprocket 32, and passes into the interior of the hollow spacer member 13. The film F passes around the rollers 35, 36, 37, and then passes around the power driven sprocket 38 at the forward end 23 of the spacer member 13. The film F then passes through a slot opening 39 defined between the spacer member 13 and the door 40. This construction is described in more detail below.

The film F then passes through the cavity 18 within the camera 10 in a conventional manner and is advanced intermittently by a conventional camera movement, not shown. The film F then passes through another slot opening 41 between the door 40 and the spacer member 13 and passes around the power driven sprocket 42, rollers 43 and 44, and around the power driven sprocket 33, back into the takeup roll within the film magazine 11. This path of movement of the film F is shown in dotted lines in FIGURE 9. Also shown in FIGURE 9 is the power train which is driven by a gear 46 in the camera 10 and which serves to drive the sprockets 38 and 42 and the sprockets 32 and 33. As shown in FIGURE 9, the gear 46 meshes with the driven gear 47 mounted on the forward end 23 of the spacer member 13 and this gear 47 meshes with gears 48 and 49 to turn the sprockets 38 and 42, respectively, in opposite directions. A gear 50 meshing with the gear 49 also meshes with a gear 51 having a pulley 52 fixed thereto. An endless belt 53 travels over the pulley 52 and the pulley 54. A gear 55 fixed to the pulley 54 drives the gear 56 mounted on the film magazine 11. The gear 56 meshes with the gears 57 and 58 and serves to drive the sprockets 32 and 33, respectively, in opposite directions. The belt 53 and pulleys 52 and 54 and cooperating gearing are protected by a removable guard 59.

A removable cover 60 closes one side of the spacer member 13 and this cover is held in positon by means of the latches 61 which engage within slot 62 formed in stationary posts 63. These latches 61 are turned by means of knobs (not shown) mounted outside the cover 60.

The film F is mounted within the film magazine 11 in a dark room. A loop of the film F projects out of the magazine from the sprocket 32 and returns into the magazine around the sprocket 33. When it is desired to thread this loop of film through the spacer 13 and through the camera movement the following steps are taken. The cover 60 is removed from the side of the spacer 13 to expose the pulleys and sprockets mounted on the spacer. The loop of film F which projects from the film magazine is then passed into the opening 27 in its entirety, and the large end 26 of the spacer member 13 is subsequently attached to the film magazine 11 by movement of the locking wedge 31. The spacer member 13 and film magazine 11 are then in the position shown in FIGURE 4. The film F is then passed around the pulleys 35, 36, 37, 43 and 44 in the path shown. At this time the camera 10 is not yet connected to the spacer member 13. The door 40 is then swung from the closed position shown in FIGURE 5 to the fully opened position shown in FIGURES 7 and 8. This door generally designated 40 includes a first part 65 attached by pivot pin 66 to the spacer member 13, and includes a second part 67 slidably mounted on the first part 65. The opening of the door occurs in two separate steps. The first step is to move the sliding part 67 from the position shown in FIGURE 5 (in the absence of cover 60) to the position shown in FIGURE 6. This sliding movement releases engaging parts 69 at opposite ends of the door part 67. This position of the parts is shown in FIGURE 6. The door part 65 may then be swung about the pivot 66 to the fully opened position shown in FIGURE 7. This action serves to clear the space between the power driven sprockets 38 and 42 so that the loop of the film F may be drawn between these sprockets and out of the interior of the spacer member 13. The film F is then engaged with the teeth of the sprockets 38 and 42 and the proper tension is established over the rollers 35, 36, 37, 43 and 44. While the loop of film which extends outside the spacer member 13 is held in roughly the position shown in FIGURE 4, in the absence of the camera 10, the door 40 is then swung from the fully opened position as shown in FIGURE 7 to the fully closed position as shown in FIGURE 5, the cover 60 being absent. The projecting part 22 on the forward end 23 of the member 13 is then passed into the opening 20 in the housing 17 of the motion picture camera 10. An access door (not shown) on the camera is opened so that the position of the loop of film F within the camera cavity 18 may be observed. The film F is placed in operating position within the camera cavity in the conventional manner and in the same manner as when the magazine 11 is mounted directly on the camera housing 17. The camera mechanism is then operated for a short time interval while the cameraman inspects the travel of the film F through the spacer member 13 and through the camera cavity 18 to check proper operation of the film F at all locations. The cover 60 is then installed on the spacer member 13 and the access door is closed on the camera. The camera is then ready for operation.

It will be observed that the construction of the spacer member 13 is such that it may be used with the conventional camera 10 and with the conventional film magazine 11 without requiring any modification of either the camera or the film magazine. This is true because the connection mechanism at the large end of the spacer member 13 duplicates the connection mechanism on the camera housing 17, and the connection mechanism on the forward end 23 of the spacer member 13 duplicates the connector mechanism conventionally provided on the film magazine 11.

Having fully described our invention, it is to be understood that we are not to be limited to the details herein set forth but that our invention is of the full scope of the appended claims.

We claim:

1. For use with a hand held motion picture camera and a film magazine therefor, the camera having a housing provided with a driving gear and the film magazine having a driven gear adapted to mesh with the driving gear, and releasable cooperating parts on the camera and film magazine for connecting them together, the improvement comprising, in combination: an elongated hollow spacer member having at one end a part for detachable connection with the camera housing, said spacer member having at the other end another part for detachable connection to the film magazine, a first gear on said spacer member adapted to mesh with the driving gear on the camera, a second gear on the spacer member adapted to mesh with the driven gear on the film magazine, means on the spacer member whereby said first gear may drive said second gear, and means within the spacer member for guiding film from the film magazine to the camera and back to the film magazine.

2. The combination of claim 1 in which the length of the spacer member is such that the camera may be placed in front of a shoulder of a photographer and held manually while the spacer member extends over the shoulder and supports the film magazine behind the shoulder.

3. The combination of claim 2 in which there is provided a shoulder-contracting support attached to the camera housing.

4. For use with a hand held motion picture camera and a film magazine therefor, the camera having a housing provided with an opening, the film magazine having a projection for detachable reception within the opening, the improvement comprising, in combination: an elongated hollow spacer member having at one end a projecting part for detachable reception within the camera housing opening, said spacer member having at the other end an opening for detachable reception of the film magazine projection, film driving means carried by the spacer member extending between said ends thereof whereby an element of the camera may drive an element of the film magazine, and means within the spacer member for guiding film magazine to the camera and back to the film magazine.

5. The combination of claim 4 in which projecting part on the spacer member is at substantially right angles to the axis of the opening on the spacer member for reception of the film magazine projection.

6. The combination of claim 4 in which the length of the spacer member is such that the camera may be placed in front of a shoulder of a photographer and held manually while the spacer member extends over the shoulder and supports the film magazine behind the shoulder.

7. The combination of claim 6 in which there is provided a shoulder-contacting support attached to the camera housing.

8. For use with a hand held motion picture camera and a film magazine therefor, the camera having a housing provided with an opening and a driving gear, the film magazine having a projection for detachable reception within the opening and having a driven gear adapted to mesh with the driving gear, the improvement comprising, in combination: an elongated hollow spacer member having at one end a projecting part for detachable reception within the camera housing opening, said spacer member having at the other end an opening for detachable reception of the film magazine projection, a first gear on said spacer member adapted to mesh with the driving gear on the camera, a second gear on the spacer member adapted to mesh with the driven gear on the film magazine, means on the spacer member whereby said first gear may drive said second gear, and means within the spacer member for guiding film from the film magazine to the camera and back to the film magazine.

9. The combination of claim 8 in which projecting part on the spacer member is at substantially right angles to the axis of the opening on the spacer member for reception of the film magazine projection.

10. The combination of claim 8 in which the length of the spacer member is such that the camera may be placed in front of a shoulder of a photographer and held manually while the spacer member extends over the shoulder and supports the film magazine behind the shoulder.

11. For use with a hand held motion picture camera and a film magazine therefor, the camera having a housing provided with an opening and a driving gear, the film magazine having a driven gear, the improvement comprising, in combination: an elongated hollow spacer member having at one end a projecting part for detachable reception within the camera housing opening, said spacer member having means at the other end for detachable connection to the film magazine, a first gear on said spacer member adapted to mesh with the driving gear on the camera, a second gear on the spacer member adapted to mesh with the driven gear on the film magazine, means on the spacer member whereby said first gear may drive said second gear, and means within the spacer member for guiding film from the film magazine to the camera and back to the film magazine.

12. The combination of claim 11 in which the length of the spacer member is such that the camera may be placed in front of a shoulder of a photographer and held manually while the spacer member extends over the shoulder and supports the film magazine behind the shoulder, and a shoulder-contacting support attached to said camera.

13. In combination; a hand held motion picture camera having a housing provided with an opening, an elongated hollow spacer member having at one end a projecting part for detachable reception within the camera housing opening, said spacer member having an opening at its other end, a film magazine having a projection for detachable reception within the opening, film driving means carried by the spacer member extending between said ends thereof whereby an element of the camera may drive an element of the film magazine, and means within the spacer member for guiding film from the film magazine to the camera and back to the film magazine.

14. The combination of claim 13 in which the length of the spacer member is such that the camera may be placed in front of a shoulder of a photographer and held manually while the spacer member extends over the shoulder and supports the film magazine behind the shoulder, and a shoulder-contacting support attached to said camera.

15. For use with a hand held motion picture camera and a film magazine therefor, the camera having a housing provided with an opening, the improvement comprising, in combination: an elongated hollow spacer member having at one end a projecting part for detachable reception within the camera housing opening, film drive sprockets mounted within the hollow spacer member adjacent said projecting part, a door movably mounted on the spacer member and defining therewith slots through which film may travel to and from said sprockets, the door being movable to an inoperative position to permit a loop of film to be moved laterally out of the spacer member and into the interior of the camera housing, and means at the other end of the spacer for connection to the film magazine.

16. For use with a motion picture camera having a housing provided with an opening, the improvement comprising, in combination: a hollow film transport member having at one end a projecting part for detachable reception within the camera housing opening, film drive sprockets mounted within the hollow film transport member adjacent said projecting part, a door movably mounted on said projecting part and defining therewith slots through which film may travel to and from said sprockets, the door being movable to an inoperative position to permit a loop of film to be moved laterally out of the spacer member and through the opening in the camera housing.

17. The combination of claim 16 in which the door is formed of two parts, the first part being pivotally mounted on the spacer member and the second part being slidably mounted on the first part.

References Cited

UNITED STATES PATENTS

| | | | |
|---|---|---|---|
| 1,510,527 | 10/1924 | Rothe | 352—243 X |
| 1,657,795 | 1/1928 | Guerin | 352—242 X |
| 2,890,619 | 6/1959 | Waller | 352—70 |
| 3,078,757 | 2/1963 | Austin | 352—243 |
| 3,279,666 | 10/1966 | Graves | 352—70 X |

NORTON ANSHER, Primary Examiner

M. H. HAYES, Assistant Examiner

U.S. Cl. X.R.

352—242, 243